UNITED STATES PATENT OFFICE.

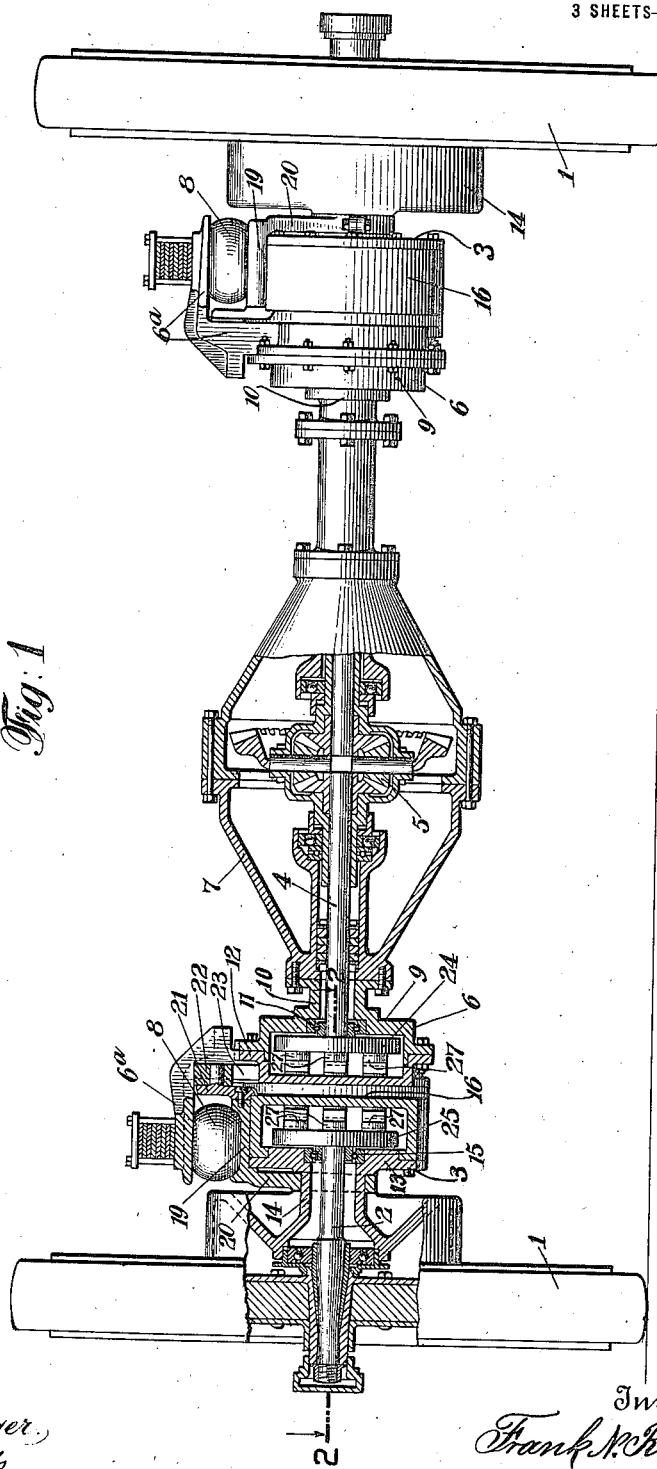

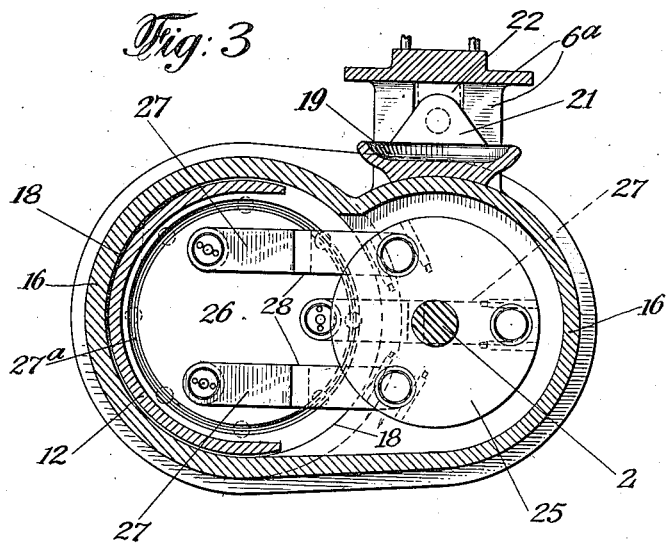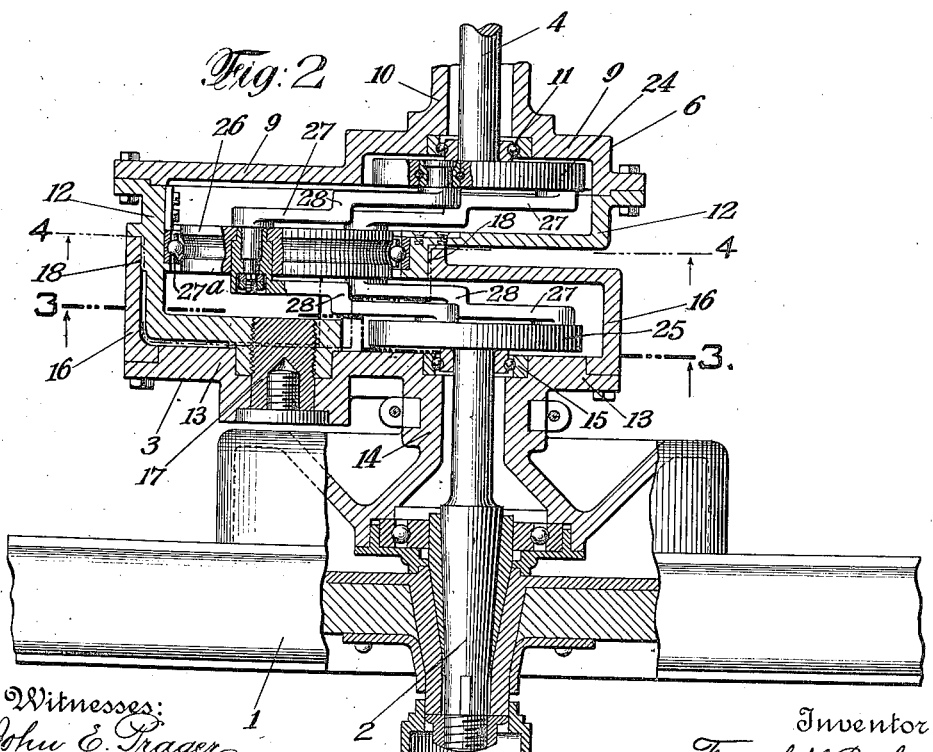

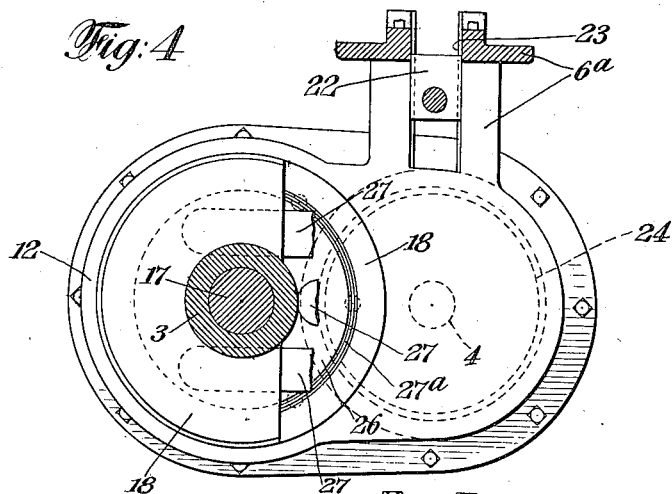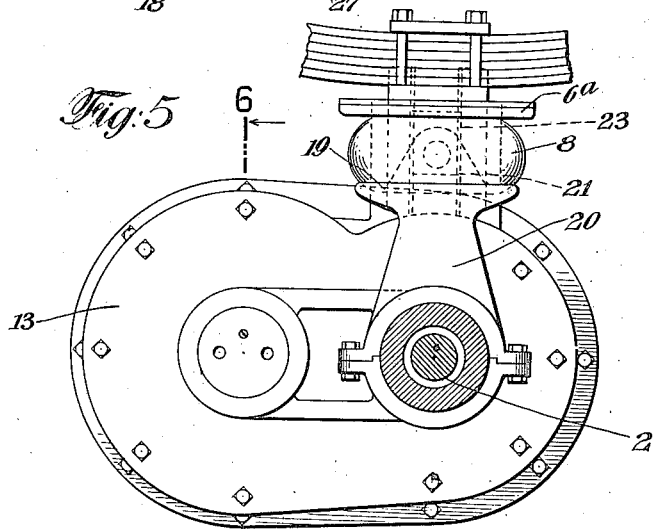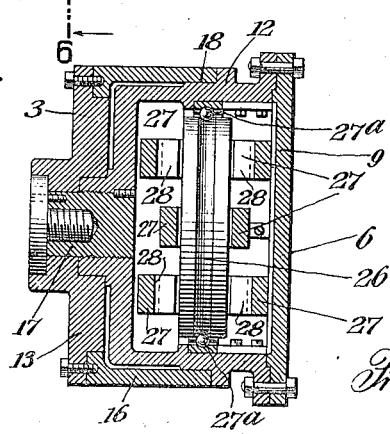

FRANK N. ROEHRICH, OF JERSEY CITY, NEW JERSEY.

POWER-TRANSMISSION MECHANISM FOR MOTOR-VEHICLES.

1,209,337.             Specification of Letters Patent.       Patented Dec. 19, 1916.

Application filed December 26, 1911, Serial No. 667,687. Renewed May 16, 1916. Serial No. 97,959.

*To all whom it may concern:*

Be it known that I, FRANK N. ROEHRICH, a citizen of the United States, residing at Jersey City, in the county of Hudson and State of New Jersey, have invented certain new and useful Improvements in Power-Transmission Mechanism for Motor-Vehicles, of which the following is a specification.

This invention relates to power transmission mechanism more particularly designed for motor driven vehicles, such as automobiles, of the type wherein a resilient or cushioning structure is interposed between the wheels and the body of the car in such a manner as to prevent the jar of the wheels being communicated to the car body.

The principal object of my present invention is to provide between the running wheels of the vehicle and the power or driving element therefor, a transmission mechanism of novel construction which, while permitting free vertical movement of the wheels relatively to such element, will, nevertheless, insure uniform and effective transmission of the power from the latter to the wheels.

With this and other objects in view my invention, as generally stated, consists in the provision of relatively-movable supporting structures for the running wheel and the driving element and a plurality of crank and link connections between said wheel and element.

My invention also consists in various features of construction and organization which will be hereinafter described and claimed.

In the annexed drawings I have illustrated a preferred form of embodiment of my invention, and while I shall point out in detail the structural features of the mechanism shown, it is to be understood that my invention is not restricted to the precise details to which reference may be made.

In the drawings—Figure 1 is a sectional elevation of the rear running wheels and adjuncts of an automobile embodying a good form of my invention. Fig. 2 is a transverse horizontal sectional elevation, as on the line 2—2 of Fig. 1. Fig. 3 is a longitudinal vertical section, as on the line 3—3 of Fig. 2. Fig. 4 is a sectional detail, as on the line 4—4 of Fig. 2. Fig. 5 is a side elevation showing the exterior of the casing and the resilient connection for the housings comprising said casing. Fig. 6 is a transverse vertical section as on the line 6—6 of Fig. 5.

1 indicates the rear running wheels of a motor vehicle, such, for example, as an automobile, which wheels are herein illustrated as borne by stud axles 2 journaled in bearing structures 3.

4 designates the power or driving element consisting, in the present instance, of a sectional drive shaft equipped with the usual differential gearing 5.

6 indicates two supporting structures in which the outer ends of the respective shaft sections are journaled, such structures being sustained by the frame of the car in any suitable manner. In the present instance the structures 6 are represented as affixed to the differential gear case 7.

The structures 3 are connected with the adjacent shaft supporting structures 6 so as to be vertically movable, or substantially so, with respect to the latter, and resilient connections, such, for example, as pneumatic cushions or air-bags 8, are interposed between the adjoining structures so as to prevent the jar of the running wheels being communicated to the body or frame of the vehicle.

Each of the structures 6, in its preferred form, includes a side member 9 having a horizontal bearing portion 10 for the adjacent shaft section 4, (which portion may be equipped with a ball-bearing as 11), and a cap-like member 12 bolted to the outer side of the member 9 and constituting therewith a housing; while each of the structures 3, in its preferred form, similarly includes a side member 13 having a horizontal bearing portion 14 for the axle 2 of the adjacent running wheel, (which portion may be provided with a ball bearing as 15), and a cap-like member 16 bolted to the inner side of the member 13 and constituting therewith a housing.

The side member 13 of the structure 3 is pivotally connected with the adjacent side of the housing 12, as, for instance, by means of the pin and boss construction illustrated at 17, and the housing 13 is formed and arranged to encircle rotatively a circular bearing surface 18 on the housing 12, whereby one structure has capacity for oscillatory movement relative to the other.

Supported by each structure 3 is a seat 19 for the pneumatic cushion or other resilient body 8, and formed on or bolted to the adjacent structure 6 is an overhanging arm 6ª which rests upon such body. Although the seat 19 may be directly formed on or affixed to the structure 3 to partake of the arc-like motion of the latter, yet I prefer to construct and mount the seat in such a manner that its motion will be practically vertical during the oscillations of the structure 3. Accordingly I make the seat in the form of a lateral extension on the upper end of a vertical arm 20 which is pivotally hung on the bearing portion 14 of the structure 3, and I provide the inner end of the extension with an upprojecting lug 21 which is pivoted to a wrist block 22 sliding in a suitably-disposed vertical guide way 23 in the adjacent structure 6.

From the foregoing it will be seen that the complementary structures 3 and 6 constitute, in effect, a closed box or casing comprising two relatively movable housings with a resilient connection therebetween. Within these housings the active devices for efficiently transmitting the motion from the drive shaft to the wheel are mounted and thereby concealed and protected. These devices comprise two corresponding crank disks 24, 25 fast on the inner ends of the drive shaft and axle respectively, a crank disk 26 rotatably mounted in a suitable bearing in the rearward portion of the member 12 of the structure 6, and a plurality of link connections 27 between the sides of the disk 26 and the respective disks 24, 25.

In the present instance the disk 26 is supported peripherally by ball bearings 27ª in the structure 6, and three links are provided for each of the disks 24, 25. All the links are of equal length, and those of each set are pivoted at one end thereof to the disk 26 at equi-distant points from the center of the latter, and at the other end to the drive or axle disk, as the case may be, at equi-distant points from the center of such drive or axle disk; each of the links in the construction illustrated being correspondingly offset, as at 28, in order that they can freely and effectually pass each other during their operative travel. By this construction it will be seen that during the operation of the drive shaft the motion is transmitted uniformly and positively by the disk 24 and its links to the intermediate disk 26, and from the latter through the other set of links and the disk 25 to the axle; and that this motion is effectually transmitted from the drive shaft to the axle irrespective of the oscillatory vertical movement of the wheel and axle with relation to the axis of the drive shaft resulting from the resilient connection between the supporting structures for said axle and shaft.

The transmission device herein shown and described is believed to be new *per se* and to be susceptible of a wide range of use, and therefore a separate application broadly covering the same will be filed.

I claim—

1. The combination of a driving element, a driven element, relatively movable supports for said elements, a crank member on the driving element, a crank member on the driven element, an intermediate crank member, and a plurality of link connections between the last-named crank member and the other crank members.

2. In power-driven mechanism for motor vehicles, the combination with a running wheel, a support therefor, a driving element, a support therefor, and resilient connections between said supports, of a plurality of crank and link connections between said running wheel and driving element, said connections including succeeding crank members and a set of transmission links of equal length between the same, said links being arranged to travel in intersecting paths when the driving element is actuated.

3. In a power-driven mechanism for motor vehicles, the combination with a running wheel, a driving element, pivotally connected supports for said wheel and element, and a resilient connection between said supports, of a plurality of crank and link connections between said running wheel and driving element, said connections including succeeding crank members and a set of transmission links of equal length between the same, said links being arranged to travel in intersecting paths when the driving element is actuated.

4. In a power-driven mechanism for motor vehicles, the combination with a running wheel, a support therefor, a driving element, a support therefor, and resilient connections between said supports, of a crank member for the driving element, a crank member for the running wheel, a crank member mounted to rotate in one of said supports, and a plurality of link connections between the last-named crank member and the other crank members.

5. In a power-driven mechanism for motor vehicles, the combination of a running wheel, an axle therefor, a driving element, a housing provided with a bearing for said axle, a housing provided with a bearing for the driving element, said housings being associated to permit their relative vertical movement, resilient connections between the said housings, and a plurailty of crank and link connections between said running wheel and driving element, said connections including succeeding crank members and a set of transmission links of equal length between the same, said links being arranged to travel in intersecting paths when the driving element is actuated.

6. In a power driven mechanism for motor vehicles, the combination of a running wheel, an axle therefor, a driving element, a housing provided with a bearing for said axle, a housing provided with a bearing for the driving element, said housings being pivotally associated to permit their relative vertical movement, resilient connections between the said housings, and a plurality of crank and link connections between said running wheel and driving element, said connections including succeeding crank members and a set of transmission links of equal length between the same, said links being arranged to travel in intersecting paths when the driving element is actuated.

7. In a power-driven mechanism for motor vehicles, the combination of a running wheel, an axle therefor, a driving element, a housing provided with a bearing for said axle, a housing provided with a bearing for the driving element, said housings being associated to permit their relative vertical movement, resilient connections between the said housings, a crank member on the driving element, a crank member on the axle, a crank member mounted to rotate in one of said supports, and a plurality of link connections between the last-named crank member and the other crank members.

8. In a power-driven mechanism for motor vehicles, the combination with a running wheel, a driving element, pivotally connected supports for said wheel and element, said supports being pivotally connected to permit their relative vertical movement, operative connections between said running wheel and driving element, an arm pivotally connected with the support for the running wheel and provided with a cushion seat, a sliding connection between said seat and the support for the driving element, and a cushion body on the said seat, the last-named support being provided with a member resting on said body.

FRANK N. ROEHRICH.

Witnesses:
JOHN E. PRAGER,
ALBERT W. GIBBS.